Dec. 28, 1965  L. J. BINTZ  3,225,753
FIRE CHECK AND COLD START CONTROL DEVICE
FOR CRANKCASE VENTILATOR
Filed Oct. 5, 1964  2 Sheets-Sheet 1
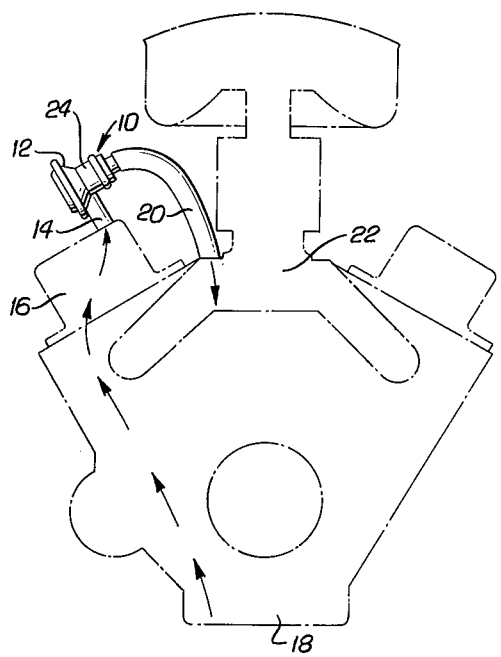
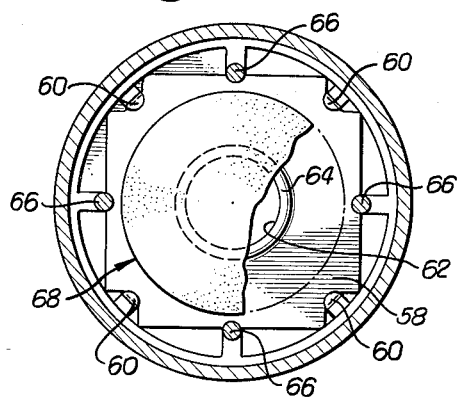
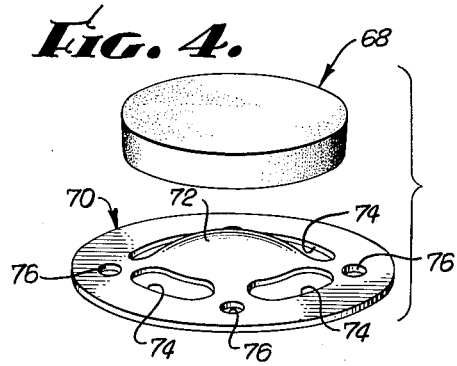
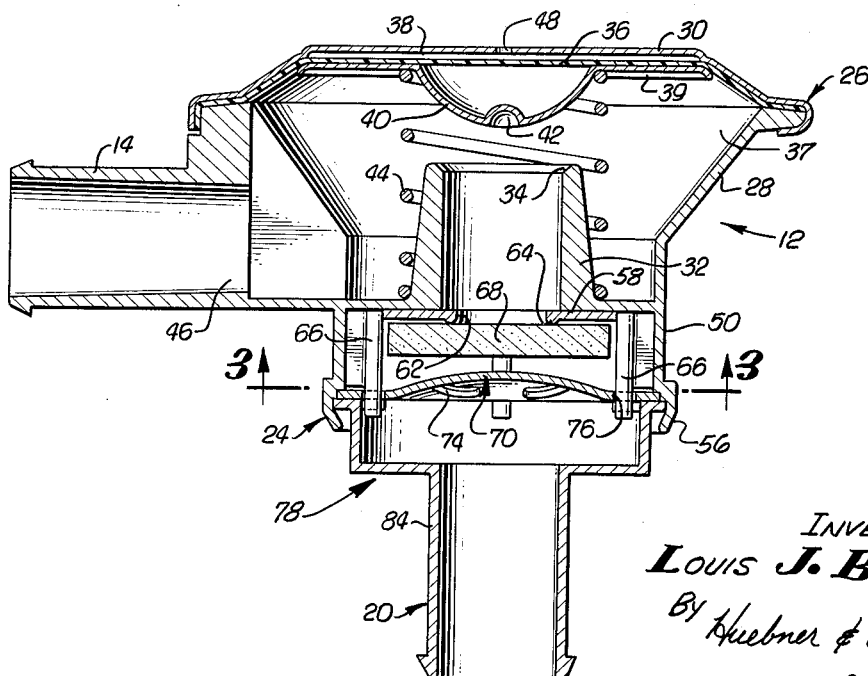
INVENTOR.
LOUIS J. BINTZ
By Huebner & Worrel
ATTORNEYS.

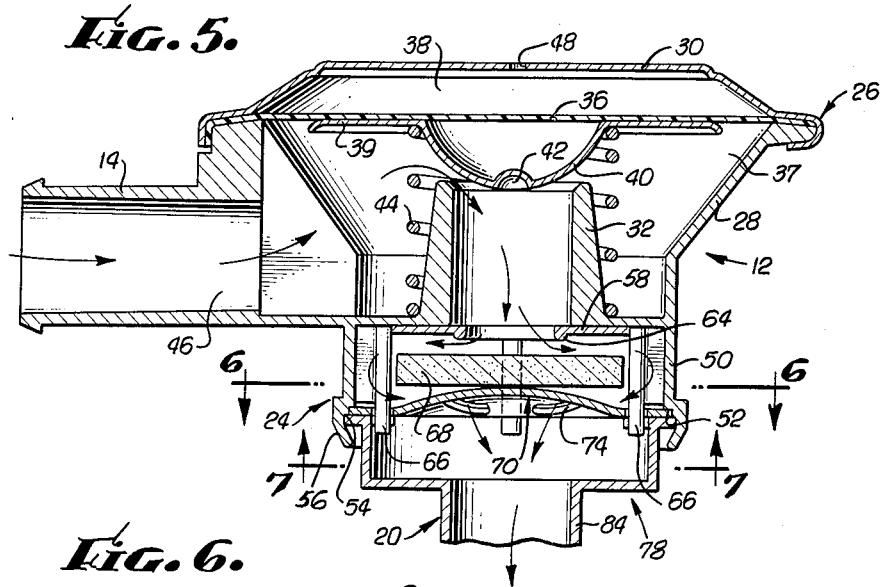
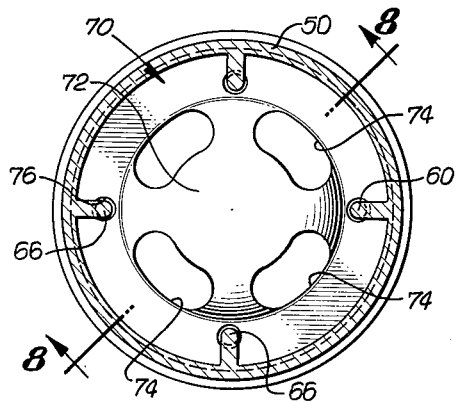
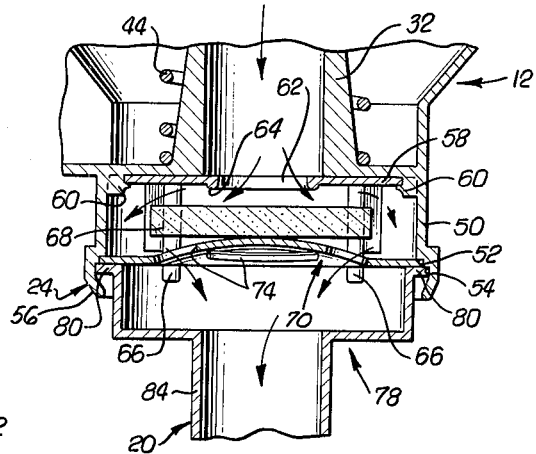
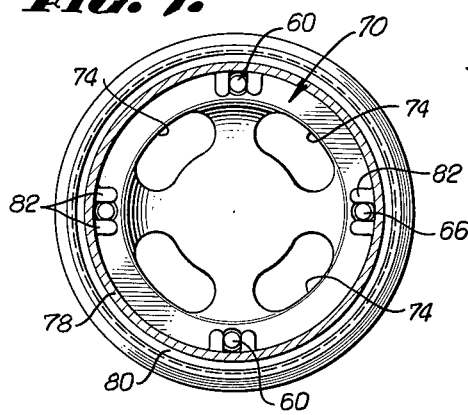
INVENTOR
LOUIS J. BINTZ
By Huebner & Worrel
ATTORNEYS.

United States Patent Office 3,225,753
Patented Dec. 28, 1965

3,225,753
FIRE CHECK AND COLD START CONTROL
DEVICE FOR CRANKCASE VENTILATOR
Louis J. Bintz, Placentia, Calif., assignor to Norris-Thermador Corporation, Los Angeles, Calif., a corporation of California
Filed Oct. 5, 1964, Ser. No. 401,344
15 Claims. (Cl. 123—119)

The present invention relates to air pollution control by ventilating blowby gases from internal combustion engine crankcases and returning these blowby gases to the air-fuel intake systems, and the invention relates particularly to a novel method and apparatus employed in connection with such crankcase ventilating systems for preserving normal carburetor operation during cold start conditions when such crankcase ventilating systems tend to disrupt the normal fuel-air mixture required for vehicle starting, and for preventing damage which might otherwise occur to the engine due to backfiring in situations where there is gasoline in the crankcase.

Control of exhaust ignitions from automotive internal combustion engines has become a serious problem in urban areas because of the large quantities of "smog"-forming and other harmful exhaust gas components, such as unburned or partially burned hydrocarbons and carbon monoxide, which are being dumped into the atmosphere from the engines of automobiles, trucks and buses. These pollutants are discharged into the air through the exhaust system of the engine, and also as gases blown past the pistons in the cylinders and into the crankcase. These contaminant-containing blowby gases are then discharged from the crankcase into the air through the oil fill cap or other crankcase vent tube, such as the road draft tube usually employed with automobile engines. Such blowby gases account for a substantial portion of the air pollutants from internal combustion engines. Several systems are presently in use for controlling these blowby exhaust gases, the systems usually involving conduit means connecting the crankcase with the intake manifold to utilize the vacuum condition in the intake manifold to draw the blowby exhaust gases out of the crankcase and into the vehicle intake system, so that the combustibles in the blowby gases, which are the principal harmful ingredients, will again be subjected to the engine combustion cycle. A typical crankcase ventilating system of this general type will provide the conduit between the valve rocker arm cover, which is accessible at the top of the engine and which communicates with the crankcase, and the intake manifold, which is also readily accessible. Some valve means is normally employed in the conduit so as to restrict or control the volume of gas flow from the crankcase to the intake manifold, in an attempt to prevent the application of too much vacuum to the crankcase, as this would tend to draw air in through the crankcase seals, and at the same time to prevent the introduction of so much air to the engine intake system from the crankcase as to disrupt carburetion.

One such internal combustion engine crankcase ventilating system which has been found satisfactory is disclosed in copending application Serial No. 321,556, filed November 5, 1963, entitled "Apparatus for Ventilating Internal Combustion Engine Crankcase," which is a joint application of the present applicant and Kenneth E. Rawald. Said copending application Serial No. 321,556 employs a flow regulator valve in the conduit from the crankcase to the intake manifold which is responsive both to intake manifold vacuum and to the vacuum or pressure condition within the crankcase so as to meter the flow from the crankcase to the intake manifold generally in accordance with the amount of the blowby gases which are accumulating in the crankcase under various engine operating conditions. Although the present invention may be employed in connection with any crankcase ventilating system of the type embodying a conduit from the crankcase to the engine intake manifold, I have shown and described the present invention in association with a system having a flow regulator valve of the type disclosed in said copending application Serial No. 321,556, because when the invention is used in combination with such system the conduit from the crankcase to the intake manifold is properly apertured for substantially all conditions of engine operation likely to be encountered.

There are several problems in connection with crankcase ventilating systems which it is a purpose of the present invention to cure in a more effective and efficient manner than has previously been accomplished. One problem is that when the engine is being started, particularly in cold weather, air is drawn into the intake manifold from the crankcase through the communicating conduit of the ventilating system, which breaks the vacuum in the manifold and disturbs the fuel-air mixture, thus making starting of the engine much more difficult than it would normally be. Another problem which it is the purpose of the invention to cure is that under certain engine operating conditions, such as when cranking the engine during cold starts, raw gasoline or gasoline fumes are likely to accumulate in the crankcase, and if the engine should backfire, i.e. if the mixture should ignite in the intake manifold and carburetor, with the added crankcase ventilating conduit the backfire flame will pass through the conduit and a damaging explosion may occur in the crankcase.

In view of these and other problems in the art, it is an object of the present invention to provide novel apparatus for use in a crankcase ventilating system of the type providing communication between the crankcase and the engine intake manifold wherein the ventilating conduit from the crankcase to the intake manifold is effectively closed during engine starting conditions, and particularly when the engine is cold, so that the intake fuel-air mixture will not be disturbed by air being sucked in from the crankcase, yet which does not interfere with the normal crankcase ventilating operation of the system under other engine operating conditions.

Another object of the present invention is to provide a method and apparatus of the character described for use in a crankcase ventilating system, which will positively block the passage of backfire flames from the intake manifold through the crankcase ventilating conduit so that any gasoline or gasoline fumes in the crankcase cannot be ignited by backfiring.

A more specific object of the present invention is to provide a novel magnetically closing valve apparatus in a crankcase ventilating system which includes a movable valve element and a valve seat, both of which are composed of magnetic material and at least one of which is magnetized, whereby when the engine is not operating or is operating at low starting r.p.m. the valve element will be magnetically closed against the seat to prevent disturbance of the normal fuel-air mixture at that time, the gas flow through the valve apparatus being sufficient when the engine is running to hold the valve element off of the seat in its open position so that free flow of blowby exhaust gases from the crankcase to the intake manifold will be permitted under all normal engine operating conditions; the valve apparatus being arranged so as to automatically close in response to backfire pressure in the intake system to protect against crankcase explosions.

A further object of the invention is to provide novel magnetically operating valve apparatus for cold start and backfire in a crankcase ventilating system, at least one of the two magnetically attracting members being of a composition such that its magnetic property is reduced when the engine temperature increases from cold start conditions to normal operating temperatures, whereby the magnetic biasing force closing the blowby passage is fully effective during cold start conditions but is reduced during normal engine operation so as to prevent inadvertent closure of the passage during momentary or transient conditions of low intake manifold vacuum, which might occur, for example, when the throttle is suddenly fully depressed.

A still further object of the invention is to provide a crankcase ventilating system of the character described wherein one of the magnetically attracting members is composed of a combination of magnetic material and elastomer material providing a resilient quality which improves the valve seal during cold start and backfire conditions, and also reduces flutter noise within the valve.

Further objects and advantages of the present invention will appear during the course of the following part of the specification, wherein the details of construction and mode of operation of a presently preferred embodiment are described with reference to the accompanying drawings, in which:

FIGURE 1 is an elevation view showing crankcase ventilating apparatus embodying the present invention in a typical installation, with an associated internal combustion engine graphically represented in phantom.

FIGURE 2 is an axial section through the flow regulator valve of the system shown in FIGURE 1, with the flame arrestor and cold start control valve means of the present invention disposed in the same case as the flow regulator, the elements of the flow regulator and flame arrestor-cold start control valve means being shown in their positions of repose, as they would be when the engine is shut off or is being cranked for starting.

FIGURE 3 is a cross-sectional view taken on the line 3—3 in FIGURE 2, further illustrating internal details of construction of the flame arrestor-cold start control valve means.

FIGURE 4 is an exploded view illustrating components of the invention shown in FIGURES 2 and 3.

FIGURE 5 is an axial sectional view similar to FIGURE 2, but with the elements of both the flow regulator and the flame arrestor-cold start control valve means in positions they would assume during engine operation.

FIGURE 6 is a cross-sectional view taken on the line 6—6 in FIGURE 5.

FIGURE 7 is a cross-sectional view taken on the line 7—7 in FIGURE 5.

FIGURE 8 is a fragmentary axial sectional view taken on the line 8—8 in FIGURE 6.

Referring to the drawings, and at first particularly to FIGURE 1 thereof, the crankcase ventilating apparatus in which the present invention is employed is designated generally by the numeral 10, and includes a flow regulator 12 having an inlet conduit 14 which is connected to engine rocker arm cover 16. The blowby exhaust gases accumulating in the engine crankcase 18 flow through the engine along the path shown by the arrows to the space within rocker arm cover 16, and thence into conduit 14. The flow regulator 12 has an output conduit 20, including a flexible hose, which is connected to a suitable fitting on the intake manifold 22 of the engine. The fire check-cold start control device 24 of the present invention has been shown embodied within an extension of the housing for the flow regulator valve 12, although it is to be understood that the device 24 may be disposed at any suitable place in the flow conduit means from the crankcase 18 to the intake manifold 22. Preferably, the fire check-cold start control device will be disposed in the conduit means on the intake manifold side of the flow regulator valve 12 so as to provide backfire protection for the flow regulator valve 12.

FIGURES 2 through 8 illustrate the details of construction of the flow regulator valve 12 and the associated presently preferred form 24 of the fire check-cold start control device. Although the device 24 may be employed in connection with any crankcase ventilating system which provides connection between the crankcase and the intake manifold, the particular system with which the device 24 has been shown in the drawings cooperates with the fire check-cold start control device to provide substantially the desired rate of gas flow through the system under virtually all conditions of engine operation.

The flow regulator valve 12 has a casing 26 which includes a body 28 and a cap 30 peripherally clamped to the body 28. Formed as a part of the body 28 is a valve outlet nozzle 32 having an inner end opening 34 which provides the valve seat. A flexible diaphragm 36 is peripherally clamped between the body 28 and the cap 30 so as to divide the space within the casing 26 into a pair of chambers 37 and 38, the chamber 37 being on the body side of the diaphram and the chamber 38 being on the cap side of the diaphragm.

A diaphragm plate 39 seats against diaphragm 36, and has a central bulge 40 which is adapted to seat in the nozzle opening 34 in the closed position of the flow regulator valve. The bulge 40 has a bleed slot 42 therein to permit a small amount of gas flow through the valve even in such closed position. Valve spring 44 is engaged at one end against the body 28, being positioned over valve outlet nozzle 32, and is engaged at its other end against the diaphragm plate 39, the spring 44 holding plate 39 against diaphragm 36 and biasing the diaphragm and plate away from the nozzle opening 34 so that the position of repose of the valve is the open position, as illustrated in FIGURE 2. The spring 44 engages the diaphragm plate proximate the annular juncture between the bulge 40 and the flat part of the plate, so that the spring 44 tends to center the bulge 40 with respect to the nozzle opening 34. Otherwise, the plate 39 is free-floating with respect to diaphragm 36, so that the plate bulge 40 has a self-centering action as it moves into the closed position in the nozzle opening 34. By this means, proper closure of the flow regulator valve is assured despite irregularities which might occur from manufacturing tolerances or some physical damage to the valve, thus assuring relatively accurate control of the exhaust gas flow through the valve.

The inlet conduit 14 which is connected to the engine rocker arm cover communicates with valve chamber 37 through a valve inlet port 46.

An atmosphere vent hole 48 is provided in cap 30 so that chamber 38 is at atmospheric pressure.

The spring 44 is a relatively light spring which is adapted to keep the valve nozzle open for outlet gas pressures (i.e. intake manifold negative pressures) equal to and more positive than a pre-selected outlet gas pressure. Thus, the spring has a force equal to the desired valve opening pressure times the effective diaphragm plate area opposite the valve nozzle opening 34.

The pre-selected pressure to be maintained at the regulator valve inlet port 46, and hence in the crankcase chamber itself, is a negative pressure sufficient to draw all of the blowby gases out of the crankcase, yet which is not so negative that too much air will be drawn into the crankcase, or to cause a tendency to draw dirt into the crankcase seals. While there is a sufficiently strong vacuum in the intake manifold to draw such blowby gases from the crankcase if a simple open tube connection were made from the manifold to the crankcase, such an arrangement is not practical because the high manifold vacuums at low speeds are too high to be transmitted directly to the crankcase. The flow regulator valve 12 which has been shown in FIGURES 2 and 5, and which has the same essential functional elements as that shown in said copending application Serial No. 321,556, provides control over the flow of gases from the crankcase to the intake manifold which closely matches the flow volume of blowby gases into the crankcase.

The operation of the flow regulator 12 is generally as follows: the intake manifold vacuums are transmitted to the regulator valve through the valve nozzle 32 with its open end 34 inside the chamber 37, these negative pressures varying from about 20 inches of mercury to less than about 1 inch of mercury. These intake manifold negative pressures act directly upon the central bulge 40 of the diaphragm plate, on an area about equal to the cross-sectional area of the nozzle opening 34, tending to pull the diaphragm and diaphragm plate against the open end of the valve nozzle to shut it. The spring 44 functions to push the diaphragm plate and diaphragm away from the open end of the valve nozzle when the blowby rate increases so that these gases may pass into the nozzle.

The spring 44 forces the diaphragm plate and diaphragm away from the nozzle opening when the intake manifold vacuum tending to close the valve becomes weaker than the force of the spring tending to open the valve. The spring is selected so as to have a valve opening force equal to the force of a pre-selected intake manifold negative pressure, as for example about 16 or 15 inches of mercury. The diaphragm will, therefore, be drawn against the open end of the valve nozzle at high manifold vacuums, as for example 20 to 16 inches of mercury. The blowby flow rate at these high manifold vacuums is low and the small amount of blowby gases are drawn into the valve nozzle opening through various leakage points, or by the limited access port formed by the bleed slot 42. When the intake manifold vacuums become weaker, or more positive, as for example 16 or 15 inches negative pressure, the force of the spring pushes the diaphragm plate and diaphragm away from the valve nozzle opening allowing a larger gas passage to the valve nozzle. The blowby gas flow rate is beginning to increase at these manifold pressures, and gases are able to easily flow into the valve nozzle opening because of the larger access area. The now increasingly absolute, or more positive, pressures in the crankcase provide a lifting force against the diaphragm tending to push the diaphragm and diaphragm plate further away from the valve nozzle opening, making an even greater access passage.

There is always a negative pressure in the crankcase. At high intake manifold vacuums, the direct manifold action drawing the diaphragm plate and diaphragm down against the nozzle will be assisted by the weaker negative pressure in the crankcase, which will also tend to keep the valve shut by pulling of the larger area of the diaphragm which is radially outwardly disposed relative to the nozzle. However, as the intake manifold vacuum becomes weaker, the crankcase vacuum likewise becomes weaker; and once the spring has opened the valve the crankcase vacuums will become increasingly weaker, tending to allow the spring to push the diaphragm even further way. In this regard, it is to be noted that the terms used herein stating that negative pressures or vacuums become weaker, or more absolute, or more positive, mean that the pressure is approaching atmospheric pressure.

The crankcase pressures exert only a small diaphragm lifting pressure, but they exert their force on a much larger area of the diaphragm than the intake manifold pressures. These crankcase pressures exert their force over an annular portion of the diaphragm extending from the diaphragm flexure or bending line in to about the circular area of the bulge of the diaphragm plate adjacent the open end of the nozzle. The diaphragm lifting action of the increasingly more absolute crankcase pressures on the larger area of the diaphragm increasingly releases the spring biasing force on the diaphragm plate and the spring pushes the diaphragm plate away from the valve nozzle providing a maximum size passage for unrestricted flow into the valve nozzle, and this condition is the condition of engine operation which provides high blowby flow rates.

As the engine speed or workload increases, the blowby flow rate will increase, and at the same time the intake manifold vacuum will decrease. Conversely, as the engine speed or workload decreases, the blowby flow rate decreases, while at the same time the intake manifold vacuum tends to increase. As seen from the above description of the operation of flow regulator valve 12, the valve tends to be closed by increased manifold vacuums, and tends to be opened by increased flow rates of blowby gases into the crankcase, which tends to increase crankcase pressure, whereby the combined effects tend to modulate the valve so as to accommodate the flow of blowby gases at various engine operating conditions without applying too much vacuum to the crankcase, and without providing too much air from the crankcase to the intake manifold so as to interfere with proper carburetion.

FIGURE 5 illustrates the flow regulator valve 12 in a slightly open position, which would correspond to a moderate engine speed or workload, while FIGURE 2 illustrates the regulator valve in its completely open position, or position of repose, which is the position of the valve when the engine is not operating. It will be apparent when the engine is being cranked for starting, at which time it is revolving at only about 50 to 150 r.p.m., the intake manifold vacuum will not be sufficient to cause any substantial closing of the valve 12, so that during this condition the flow regulator valve 12 provides practically a wide open communication between the crankcase and the intake manifold. However, such wide open communication between the crankcase and intake manifold would destroy the effectiveness of the choke valve for starting the engine when it is cold, by breaking the intake manifold vacuum and providing added air so that the mixture would be too lean for proper starting. Thus, it is important for proper cold starting to provide additional flow control means in the conduit from the crankcase to the intake manifold which will be substantially closed during cold start conditions to compensate for the substantially wide open condition of the flow regulator valve 12, and this additional means is provided by the fire check-cold start control device of the present invention.

Another circumstance in which it is important to close the conduit between the crankcase and the intake manifold is whenever there is a backfire (i.e. inadvertent ignition of the fuel-air mixture in the carburetor-intake manifold system). This latter circumstance is most dangerous whenever there is a tendency for raw gasoline or gasoline fumes to concentrate in the crank case, which tends to occur during cold start conditions and also frequently when the engine has been operating, is turned off, and is again turned on while it is still hot. The present invention automatically blocks the conduit between the crankcase and intake manifold whenever there is such a backfire, regardless of how open the regulator valve 12 might be at that particular condition of engine operation.

The body 28 of the casing for the flow regulator valve is provided with an extension 50 for housing the fire check-cold start control device 24. Extension 50 has a pair of annular shoulders 52 and 54 in stepped arrangement, beyond which the extension terminates in an annular lip 56.

Disposed against the downstream end of nozzle 32 is a valve seat member 58 comprising a generally square, flat sheet retained in position against the downstream end of the nozzle 32 by retaining ears 60 which are formed over the corners of the seat member 58. Valve seat member 58 has a central opening 62 which is generally axially aligned with the passage through the nozzle 32, and has an annular bead 64 adjacent to the opening which assists in sealing and in minimizing valve flutter noise.

A plurality of guide posts or pins 66, being four in number in the embodiment illustrated, project downwardly from the wall that supports nozzle 32, the posts 66 being generally parallel to the body extension 50 but spaced inwardly therefrom. Floatingly positioned within the body extension 50 and between the posts 66 is a valve element 68 which is preferably formed as a disc or circular wafer, but which may be provided in other suitable shapes as desired. The valve element 68 is held in a position generally axially aligned with the valve seat opening 62 by the guide posts 66 but is movable axially between a closed position seated against the annular bead 64 of the valve seat as shown in FIGURE 2 and an open position spaced axially from the valve seat as shown in FIGURE 5.

The amount of opening movement of the valve element 68 is limited by a spacer plate 70 which extends across the body extension 50 and seats against the shoulder 52. The spacer plate 70 is provided with a central bulge 72 which bulges toward the valve seat, and has a plurality of passages 74 disposed radially outwardly of the bulge. With this construction the amount of opening movement of the valve element 68 will be limited by abutment of the valve element against the central bulge 72 of the spacer plate as shown in FIGURES 5 and 8, and the bulge will prevent the valve element from closing off the passages 74 in the spacer plate, so that blowby gases from the crankcase are free to pass through the nozzle 32 and the valve seat opening 62, around the valve element 68 between the peripheral edge of the valve element and the body extension 50, and thence through the passages 74 in the spacer plate 70.

The spacer plate 70 also has guide holes 76 near its peripheral margin through which the guide posts or pins 66 fit for securely positioning the spacer plate 70.

The fire check and cold start device 24 is complete by a closure 78 which has an outwardly directed annular flange 80 that fits into the body extension lip 56 and seats against the shoulder 54 and also abuts against the periphery of spacer plate 70 to secure plate 70 in position. The closure 78 has inwardly projecting notched tabs 82 best shown in FIGURE 7 which engage the end portions of the guide posts 66 to prevent rotation and consequent loosening of the closure 78, and the annular lip 56 on the body extension is turned inwardly to secure the closure 78 in position. The closure 78 also has a tubular nipple 84 which extends downstream and is adapted to provide a hose connection for the hose portion of the output conduit 20 shown in FIGURE 1 leading to the intake manifold.

An important feature of the present invention is that the valve seat member 58 and the valve element 68 are both composed of magnetic material, commonly referred to as ferromagnetic, and at least one of these two members is magnetized, so that the valve element 66 is magnetically biased toward its seated position as shown in FIGURE 2. Although either of these two members 58 and 68, or both of them, could be magnetized, in one embodiment of the invention which has been satisfactorily tested the valve seat member 58 was not magnetized but merely comprised a magnetic susceptor composed of magnetic material, while the valve element 68 was magnetized.

Although any of a wide variety of magnetic materials may be employed in the valve element 68 and the seat 58, it has been found desirable to provide a magnetic composition for the valve element 68 which includes a suitable powdered magnetic material and an elastomer binder. A composition which has provided good results for the valve element 68 includes about 90% barium ferrate powder and about 10% buna-N, neoprene or other elastomer binder. The associated seat 58 may be mild steel or other magnetic material. The slight surface resiliency which the elastomer provides to this composition affords a good seal of the valve element 68 against the valve seat 58, and suppresses noise which would otherwise be likely to occur by flutter of the valve element against the seat. The seal is also enhanced and flutter noise is further suppressed by employing the relatively narrow annular bead 64 about the opening 62 in the valve seat member 58.

Preferably, the valve body structure, including the body 28, extension 50, and nozzle 32 and its supporting structure in the body, as well as the spacer plate 70 and closure 78, are composed of aluminum, zinc, or other suitable non-magnetic material.

When the engine is not operating, the magnetic attraction between the seat 58 and element 68 will cause the valve element to be in sealing engagement against the valve seat as shown in FIGURE 2, so that the fire check and cold start control device 24 will be closed. The magnetic attraction between the seat 58 and the valve element 68 is sufficient when the engine is cold so that the valve element will remain seated during cranking of the engine under cold starting conditions. The seat 58 and element 68 are provided with a magnetic attraction force of such strength that an intake manifold vacuum of from about ½ to about 1½ inches of mercury will be required to pull the valve element off of the seat. That much manifold vacuum will not be produced by the approximately 50 to 150 r.p.m. that the engine starter will crank the engine when the engine is cold. However, as soon as the engine catches and the r.p.m. picks up, the intake manifold vacuum will be sufficient to move the valve element off of the seat and thereby permit normal operation of the crankcase ventilating apparatus. In the event the engine only temporarily fires up during the attempt to start it, but then dies and must be cranked again, the magnetic force will cause the valve element 68 to automatically become seated again, since the intake manifold vacuum will drop off to zero.

During practically all normal conditions of engine operation the intake manifold vacuum will be sufficient so that the flow of blowby gases through the ventilating apparatus will hold the valve element 68 off of the valve seat 58 against the biasing force of the magnetic attraction between the members 58 and 68. However, in the event of a backfire, the pressure relationship between the intake manifold and the crankcase will suddenly reverse and the combination of the reverse gas flow and magnetic attraction will instantaneously close the valve element 68 against the seat member 58 to prevent the passage of backfire flames through the fire check and cold start control device 24, thereby preventing explosion in the crankcase and also preventing any damage to the flow regulator portion of the crankcase ventilating apparatus. It has been found that during the first instant of such a backfire the flame front is diffused by the spacer plate 70, thereby allowing the valve element 68 to snap completely shut against the valve seat member 58 before any substantial amount of flame is permitted to pass into the nozzle 32.

There is, however, one engine operating condition during which the intake manifold vacuum may become so low that the valve element 68 might close against the valve seat member 58, and that is when the throttle is pressed completely to the floorboard, particularly at relatively low speeds. It is desirable to have the valve element 68 in its open position during all normal conditions of engine operation when the engine is warm, even including this rather extreme condition of engine operation, and for this reason it is preferred to provide a magnetic material for either or both of the magnetic elements 58 and 68 which has the property of losing all or part of its magnetic characteristics as the result of the increase of temperature of the engine from cold starting temperature to normal operating temperature. With the use of such a magnetic material for either or both of the magnetic members 58 and 68, the fire check and cold start control device 24 will be fully effective during cold start conditions, both to prevent disturbance of starting by closing off the crankcase ventilating passage and to prevent backfire damage, but will not be nearly so sensitive to reduced intake manifold vacuums at normal engine operating temperatures. Accordingly, during normal hot engine operation the valve element 68 will tend to remain open as shown in FIGURES 5 and 8 even if the intake manifold vacuum becomes very low, as for example when the throttle is fully depressed, but the device will still be operative when the engine is hot to instantaneously shut off the passage in the event of backfiring.

An example of a material having the quality of losing at least part of its magnetic capability with a temperature increase is barium ferrate, a material described previously which is suitable for use in the valve element 68, this material losing approximately 30% of its magnetic capability with a temperature rise of from about 0° F. to about 250° F., which is approximately the anticipated temperature range between cold engine starting conditions and hot engine operation. Other suitable magnetic materials having this same physical property to a greater or lesser degree, as desired, will suggest themselves to those skilled in the art.

In the event such a material having reduced magnetic properties at high temperatures is employed for either the seat member 58 or the valve element 68, or for both of them, it will be appreciated that the valve element 68 will more readily float off of its seat during starting when the engine is hot than it would when the engine is cold. However, engine starting is not difficult when the engine is hot, so that even though the valve element 68 might open during starting, nevertheless starting will not be impaired to any particular extent.

An important feature of the magnetic biasing of the valve element 68 against the valve seat member 58 in the operation of the device 24 to assist cold engine starting is that, contrary to spring biasing, the magnetic biasing has its maximum physical strength when the valve element 68 is actually physically positioned against the valve seat member 58 in the closed position, and the magnetic biasing force becomes materially reduced when the valve element 68 is in its open position spaced downstream from the seat. Thus, when the engine is turned off, the valve element 68 will be in its position of repose against the valve seat member, so that at this time the magnetic biasing force is at its maximum, and this maximum biasing force may be controlled by proper selection of magnetic materials and of sizes of the magnetic components so that the valve will remain closed during cold engine starts and will not open until the engine is running. However, when the engine is running and the valve element is thereby moved to its position spaced downstream of the valve seat, the magnetic biasing force is considerably reduced, and the valve element will tend to be retained in its open position with less intake manifold vacuum than was originally required to open the valve. Accordingly any tendency for the valve to close during normal engine operation upon an instantaneous or transient reduction of intake manifold vacuum will be minimized.

While the instant invention has been shown and described herein in what is conceived to be the most practical and preferred embodiment, it is recognized that departures may be made therefrom within the scope of the invention, which is therefore not to be limited to the details disclosed herein, but is to be accorded the full scope of the claims.

What I claim is:

1. A fire check and cold start control device for use in a crankcase ventilating conduit extending between the crankcase and intake manifold of an internal combustion engine, said device comprising a housing adapted to be disposed in said conduit, said housing having a passage therethrough forming a part of said conduit, a valve seat proximate said passage in said housing facing downstream for the normal direction of gas flow from the crankcase to the intake manifold, and a valve element in said housing on the downstream side of said seat, said valve seat and valve element being composed of magnetic material and at least one of them being magnetized so that said valve element is normally magnetically biased to a closed position against said seat, said valve element being held by the flow of gases in an open position spaced downstream from said valve seat during normal engine operation when the intake manifold is at a lower pressure than the crankcase to permit the substantially unimpeded flow of blowby gases from the crankcase through the conduit to the intake manifold, the magnetic biasing force being sufficient to hold the valve element in its closed position against said valve seat when the engine is being cranked during cold engine starting conditions and the intake manifold vacuum is less than during normal engine operation, and the valve element also being movable to a closed position against said seat to block the flame front from the crankcase upon a pressure reversal resulting from backfiring in the engine fuel intake system.

2. A fire check and cold start control device as defined in claim 1, wherein at least one of said valve element and valve seat members comprises a mixture of particulate magnetic material and elastomeric material and thereby has a measure of surface resiliency which improves the sealing ability of the valve element and valve seat in the closed position of the valve element and minimizes flutter noise in the valve.

3. A fire check and cold start control device as defined in claim 2, wherein the valve element comprises said mixture of particulate magnetic material and elastomeric material.

4. A fire check and cold start control device as defined in claim 1, wherein the magnetic material of one of said valve seat and valve element members has the characteristic of a substantial reduction in its magnetic property with a temperature increase in the engine from cold starting conditions to normal operating temperatures, whereby the valve element will be biased to its closed position against the valve seat with substantially full magnetic effectiveness during cold engine starting conditions to prevent disturbance of carburetion during such conditions, but the magnetic biasing force will be reduced at normal engine operating temperatures to reduce the likelihood of the valve element closing against the valve seat during normal engine operation.

5. A fire check and cold start control device as defined in claim 1, wherein said valve seat member comprises a plate of magnetic material having an opening therethrough communicating with said housing passage, and said valve element comprises a generally flat wafer of magnetic material.

6. A fire check and cold start control device as defined in claim 1, which further includes a spacer plate member of nonmagnetic material mounted in said housing and extending across said housing passage, said spacer plate being disposed downstream of said valve element and limiting the amount of opening movement of the valve element so that said valve element will remain magnetically biased toward said valve seat member in its fully opened position.

7. Apparatus for use in a crankcase ventilating conduit extending between the crankcase and the intake manifold of an internal combustion engine comprising: a flow regulator comprising a casing, a flexible diaphragm within the casing divided into a first chamber and a second chamber, said first chamber having a gas inlet and a gas outlet adapted to be connected into said conduit so that gases flowing downstream through said conduit for the normal direction of gas flow from the crankcase to the intake manifold will flow through said casing from the inlet to the outlet, a valve nozzle inside the first chamber, one end of the nozzle communicating with the gas outlet, the other end of the nozzle terminating in an open end adjacent said diaphragm, the open end of the nozzle being at least partially blocked to the passage of gases therethrough by the diaphragm when the diaphragm is drawn to the open end of the nozzle by intake manifold negative pressures in the nozzle, and a spring supported in the casing biasing the diaphragm away from the nozzle to keep open said open end of the nozzle for outlet gas pressures equal to and more positive than a pre-selected gas pressure; and a fire check and cold start control device comprising a housing adapted to be disposed in said conduit, said housing having a passage therethrough forming a part of said conduit, a valve seat proximate said passage in said housing facing downstream, and a valve element in said housing on the downstream side of said seat, said valve seat and valve element being composed of magnetic material and at least one of them being magnetized so that said valve element is normally magnetically biased to a closed position against said seat, said valve element being held by the flow of gases in an open position spaced downstream from said valve seat during normal engine operation when the intake manifold is at a lower pressure than the crankcase so that the valve element will not substantially interfere with control of the flow of blowby gases by the diaphragm, said magnetic biasing force being sufficient to hold the valve element in its closed position against said valve seat when the engine is being cranked during cold engine starting conditions and the intake manifold vacuum is less than during normal engine operation, and the valve element also being movable to a closed position against said seat to block the flame front from the crankcase upon a pressure reversal resulting from backfiring in the engine fuel intake system.

8. Apparatus as defined in claim 7, wherein said fire check and cold start control device is on the downstream side of said flow regulator.

9. Apparatus as defined in claim 8, wherein said housing of the fire check and cold start control device comprises an extension of said flow regulator casing.

10. Apparatus as defined in claim 7, wherein at least one of said valve element and valve seat members in the fire check and cold start control device comprises a mixture of particulate magnetic material and elastomeric material and thereby has a measure of surface resiliency which improves the sealing ability of the valve element and valve seat in the closed position of the valve element and minimizes flutter noise in the valve.

11. Apparatus as defined in claim 10, wherein the valve element comprises said mixture of particulate magnetic material and elastomeric material.

12. Apparatus as defined in claim 7, wherein the magnetic material of one of said valve seat and valve element members has the characteristic of a substantial reduction in its magnetic property with a temperature increase in the engine from cold starting conditions to normal operating temperatures, whereby the valve element will be biased to its closed position against the valve seat with substantially full magnetic effectiveness during cold engine starting conditions to prevent disturbance of carburetion during such conditions, but the magnetic biasing force will be reduced at normal engine operating temperatures to reduce the likelihood of the valve element closing against the valve seat during normal engine operation.

13. Apparatus as defined in claim 7, wherein said valve seat member comprises a plate of magnetic material having an opening therethrough communicating with said housing passage, and said valve element comprises a generally flat wafer of magnetic material.

14. Apparatus as defined in claim 7, which further includes a spacer plate member of non-magnetic material mounted in said housing and extending across said housing passage, said spacer plate being disposed downstream of said valve element and limiting the amount of opening movement of the valve element so that said valve element will remain magnetically biased toward said valve seat member in its fully opened position.

15. Apparatus as defined in claim 14 which includes a plurality of generally parallel guide posts that extend substantially from said valve seat member to said spacer plate and are spaced radially inwardly from said housing, said valve element being floatingly mounted between said guide posts, the guide posts thereby maintaining substantial separation between the peripheral edge of the valve element and the wall of the housing for passage of blowby gases past the valve element when the valve element is in its open position spaced downstream from the valve seat.

References Cited by the Examiner
UNITED STATES PATENTS

| | | | |
|---|---|---|---|
| 2,949,931 | 8/1960 | Ruppright | 261—65 X |
| 3,144,044 | 8/1964 | Anthes | 123—119 |
| 3,145,697 | 8/1964 | Barr | 123—119 |

KARL J. ALBRECHT, *Primary Examiner.*